United States Patent
Tanaka

(10) Patent No.: US 10,764,464 B2
(45) Date of Patent: Sep. 1, 2020

(54) IMAGE SCANNING APPARATUS WITH IMPROVED IMAGE LOCATION NOTIFICATION

(71) Applicant: KYOCERA Document Solutions Inc., Osaka (JP)

(72) Inventor: Chigusa Tanaka, Osaka (JP)

(73) Assignee: Kyocera Document Solutions, Inc. (JP)

(*) Notice: Subject to any disclaimer, the term of this patent is extended or adjusted under 35 U.S.C. 154(b) by 0 days.

(21) Appl. No.: 16/363,226

(22) Filed: Mar. 25, 2019

(65) Prior Publication Data

US 2019/0306366 A1 Oct. 3, 2019

(30) Foreign Application Priority Data

Mar. 29, 2018 (JP) ................. 2018-066036

(51) Int. Cl.
*H04N 1/32* (2006.01)
*H04N 1/00* (2006.01)

(52) U.S. Cl.
CPC ..... *H04N 1/32106* (2013.01); *H04N 1/00225* (2013.01); *H04N 1/00244* (2013.01); *H04N 1/32374* (2013.01)

(58) Field of Classification Search
CPC ........... H04N 1/32106; H04N 1/00225; H04N 1/00244; H04N 1/32374
USPC ...................................................... 358/1.15
See application file for complete search history.

(56) References Cited

U.S. PATENT DOCUMENTS

| | | | | |
|---|---|---|---|---|
| 6,459,499 B1* | 10/2002 | Tomat | ................. | H04N 1/3209 358/1.15 |
| 2005/0195446 A1* | 9/2005 | Kasatani | ............ | H04N 1/00222 358/402 |
| 2005/0237572 A1* | 10/2005 | Mori | ..................... | G06F 40/103 358/1.17 |
| 2006/0265242 A1* | 11/2006 | Kashioka | ........... | H04N 1/00244 382/100 |
| 2009/0238364 A1* | 9/2009 | Furukawa | .......... | H04N 1/00222 380/243 |
| 2012/0307300 A1* | 12/2012 | Takano | .............. | H04N 1/00217 358/1.15 |
| 2017/0289275 A1* | 10/2017 | Saito | ................... | H04L 41/0806 |

FOREIGN PATENT DOCUMENTS

JP 2006-311344 11/2006

* cited by examiner

*Primary Examiner* — Allen H Nguyen

(57) ABSTRACT

An image scanning apparatus includes an image scanning unit, an image acquiring unit, a condition determining unit, and a communication processing unit. The image scanning unit scans a document image from a document and generates image data of the document image. The image acquiring unit acquires the image data generated on a single job, generates image files including the image data, and stores the image files into a specific folder. The condition determining unit selects (a) network identifiers of the image files or (b) a network identifier of the specific folder, on the basis of the number of the image files generated and stored on the single job. The communication processing unit transmits to a specific destination a message that includes the selected network identifiers of the image files or the selected network identifier of the specific folder.

5 Claims, 5 Drawing Sheets

IMAGE SCANNING APPARATUS WITH IMPROVED IMAGE LOCATION NOTIFICATION

CROSS-REFERENCE TO RELATED APPLICATIONS

This application relates to and claims priority rights from Japanese Patent Application No. 2018-066036, filed on Mar. 29, 2018, the entire disclosures of which are hereby incorporated by reference herein.

BACKGROUND

1. Field of the Present Disclosure

The present disclosure relates to an image scanning apparatus.

2. Description of the Related Art

An image scanning apparatus stores an image file of a document image scanned from a document into a box (folder), and transmits a message (email or the like) including a URL (Uniform Resource Locator) of the image file, and thereby provides a function that a user specifies the URL included in the message by operating a terminal device or the like and downloads the image file (i.e. scan URL transmission function).

However, in the aforementioned apparatus, when plural image files are generated and stored on a single job, if a large number of image files are stored, then the message informs the user of a large number of URLs of the same number as the number of the stored image files, and therefore, when the user wants to download a part (e.g. one) of the plural image files, the user must specify the URLs and download the image files in turn until the user's desired image file is downloaded. Thus, such ordinary scan URL transmission function has low usability.

SUMMARY

An image scanning apparatus according to an aspect of the present disclosure includes an image scanning unit, an image acquiring unit, a condition determining unit, and a communication processing unit. The image scanning unit is configured to scan a document image from a document and generate image data of the document image. The image acquiring unit is configured to acquire the image data generated on a single job, generate image files including the image data, and store the image files into a specific folder. The condition determining unit is configured to select (a) network identifiers of the image files or (b) a network identifier of the specific folder, on the basis of the number of the image files generated and stored on the single job. The communication processing unit is configured to transmit to a specific destination a message that includes the selected network identifiers of the image files or the selected network identifier of the specific folder.

These and other objects, features and advantages of the present disclosure will become more apparent upon reading of the following detailed description along with the accompanied drawings.

DETAILED DESCRIPTION

Hereinafter, embodiments according to an aspect of the present disclosure will be explained with reference to drawings.

Embodiment 1

Figure 1:
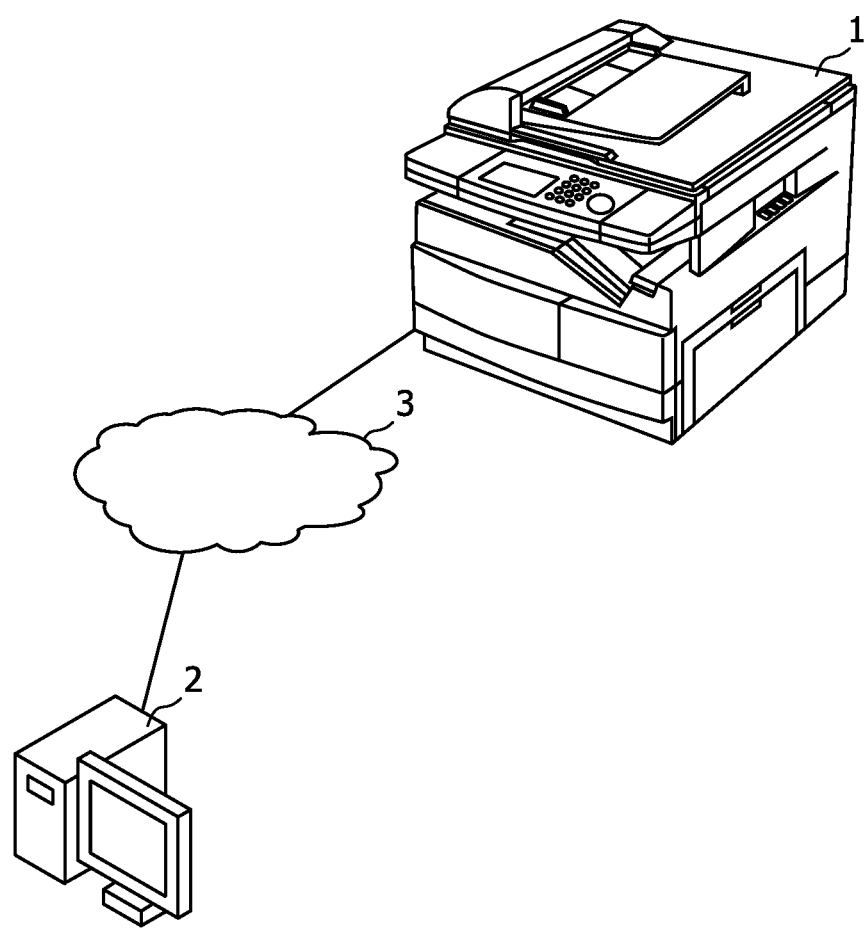
FIG. 1 shows a perspective view diagram that indicates an image scanning apparatus according to an embodiment of the present invention.

FIG. 1 shows a perspective view diagram that indicates an image scanning apparatus according to an embodiment of the present invention. In FIG. 1, the image scanning apparatus 1 is a multi function peripheral that has an image scanning function, and is a sort of an image scanning apparatus. A terminal device 2 is a terminal device such as personal computer operated by a user, and is capable of communicating with the image scanning apparatus 1 through a network 3.

Figure 2:
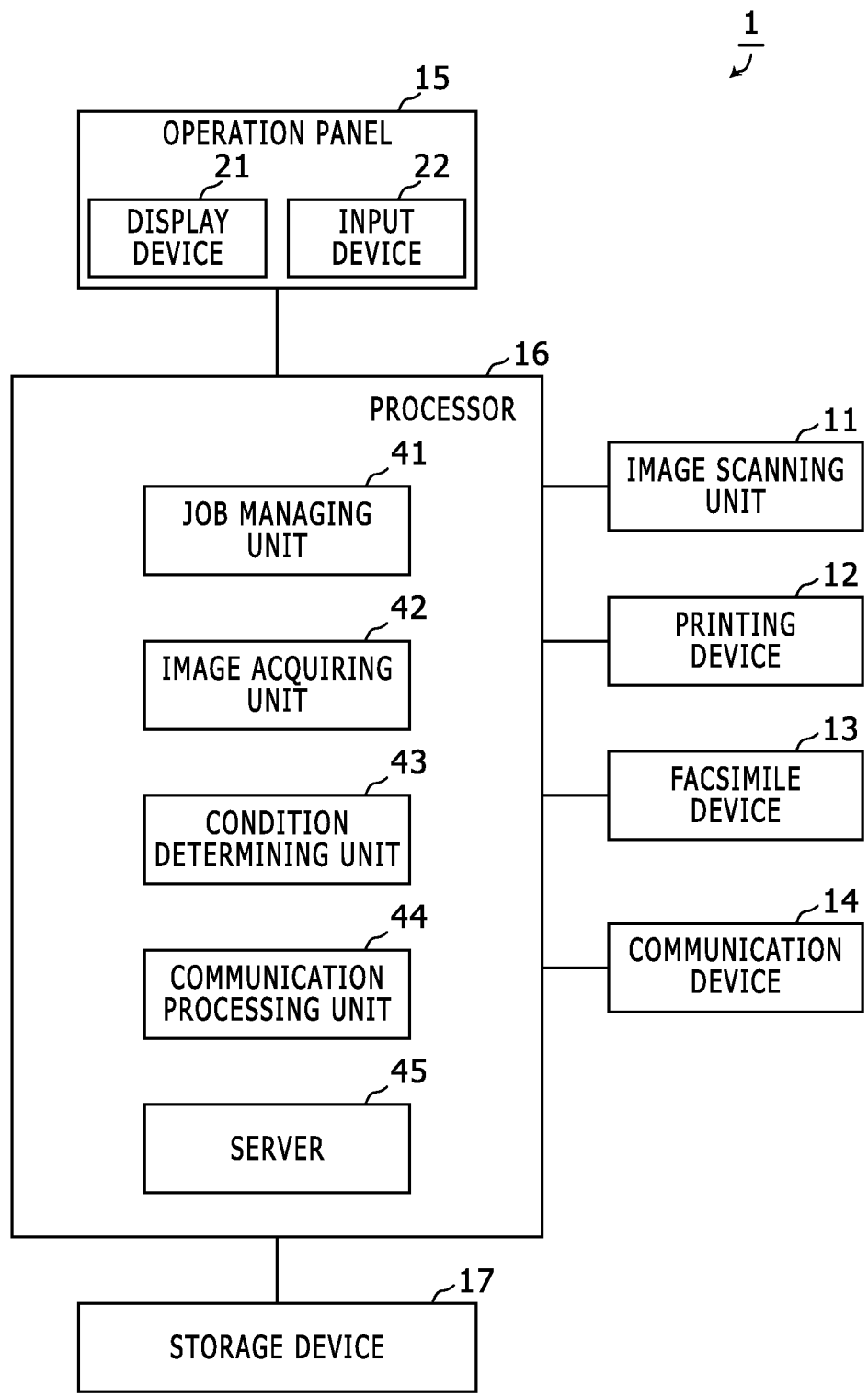
FIG. 2 shows a block diagram that indicates a configuration of the image scanning apparatus 1 shown in FIG. 1.

FIG. 2 shows a block diagram that indicates a configuration of the image scanning apparatus 1 in FIG. 1. The image scanning apparatus 1 shown in FIGS. 1 and 2 includes an image scanning unit 11, a printing device 12, a facsimile device 13, a communication device 14, an operation panel 15, a processor 16, a storage device 17, and the like.

The image scanning unit 11 is an internal device that optically scans a document image from a document put on a platen glass or a document fed by an auto document feeder, and generates image data of the document image.

The printing device 12 is an internal device that performs printing of an image based on the image data obtained with the scanning or the like.

The facsimile device 13 is an internal device that transmits the image data obtained with the scanning as a facsimile signal, and receives a facsimile signal and generates image data.

The communication device 14 is an internal device such as network interface or a near field communication interface that performs communication with the terminal device 2.

The operation panel 15 is arranged on an upper surface of a housing of the image scanning apparatus 1, and includes a display device 21 that displays a screen to a user and an input device 22 that receives a user operation performed by the user. The display device 21 is a liquid crystal display or the like. The input device 22 is a hard key, a touch panel that forms a soft key with the display device 21, and/or the like.

The processor 16 includes ASIC (Application Specific Integrated Circuit), a computer and/or the like and the computer includes a CPU (Central Processing Unit), a ROM (Read Only Memory), a RAM (Random Access Memory), and the like, and the processor 16 acts as processing units using the ASIC, the computer and/or the like. Specifically, the processor 16 loads a program stored in the ROM or a storage device (not shown) to the RAM, and executes the program with the CPU and thereby acts as processing units, namely by means of software, and/or acts as processing units using the ASIC and the like, namely by means of hardware.

The processor 16 acts as a job managing unit 41, an image acquiring unit 42, a condition determining unit 43, a communication processing unit 44, and a server 45.

The job managing unit 41 performs a job such as a scan URL transmission job using the internal devices when receiving a job request of the job.

The image acquiring unit 42 acquires the image data generated on a single job from the image scanning unit 11, generates an image file including the image data, and stores the image file into a specific folder. This specific folder is arranged in the internal storage device 17, an external storage device (not shown), or the like.

For example, when generating an image file for a document of plural pages with a single job, it is selected on the basis of a job setting (a) to generate and store one image file (e.g. PDF file) that includes page images of the plural pages or (b) to generate and store plural (N) image files (e.g. PDF files) that include respective page images of plural pages (N pages).

The condition determining unit 43 selects (a) network identifiers of the image files generated and stored on the single job as mentioned or (b) a network identifier of the specific folder, on the basis of the number of the image files generated and stored on the single job.

Specifically, if the number of the image files generated and stored on the single job is equal to or less than a predetermined value, the condition determining unit 43 selects the network identifiers of the image files; and if the number of the image files generated and stored on the single job is larger than the predetermined value, the condition determining unit 43 selects the network identifier of the specific folder.

Here, this "predetermined value" is set as 1. However, this "predetermined value" can be set by a user, and may be 2 or more (e.g. 3).

This "network identifier" is a URL, for example.

The communication processing unit 44 transmits a message to a specific destination using the communication device 14, and this message includes the network identifier(s) selected by the condition determining unit 43, namely (a) the network identifiers of the image files or (b) the network identifier of the specific folder. This message is transmitted in accordance with a predetermined protocol. In this embodiment, this message is transmitted as an email. Further, this "specific destination" is a destination (e.g. email address or the like) specified by a user operation or a user setting. It should be noted that the message includes the aforementioned network identifier(s), but does not include shrunk images or the like of the image files.

The server 45 receives a request that specifies a network identifier using the communication device 14, and when receiving the request, reads a file corresponding to the network identifier, and transmits the file to a sender of the request as a response to the request. In accordance with a user operation, the terminal device 2 acquires the aforementioned message and transmits a transmission request that specifies a network identifier (here, URL) included in the aforementioned message.

In this embodiment, when plural image files are generated and stored into the specific folder on a single job, the image acquiring unit 42 generates a page data file to display a list of the image files stored into the specific folder, and stores the page data file into the specific folder. The server 45 (a) transmits an image file when receiving a request that specifies a network identifier of the image file, and (b) transmits the page data file when receiving a request that specifies a network identifier of the specific folder.

For example, the server 45 is a web server, the aforementioned network identifier is a URL, and the aforementioned page data file is a file (index.html) described in HTML (HyperText Markup Language).

Figure 3:
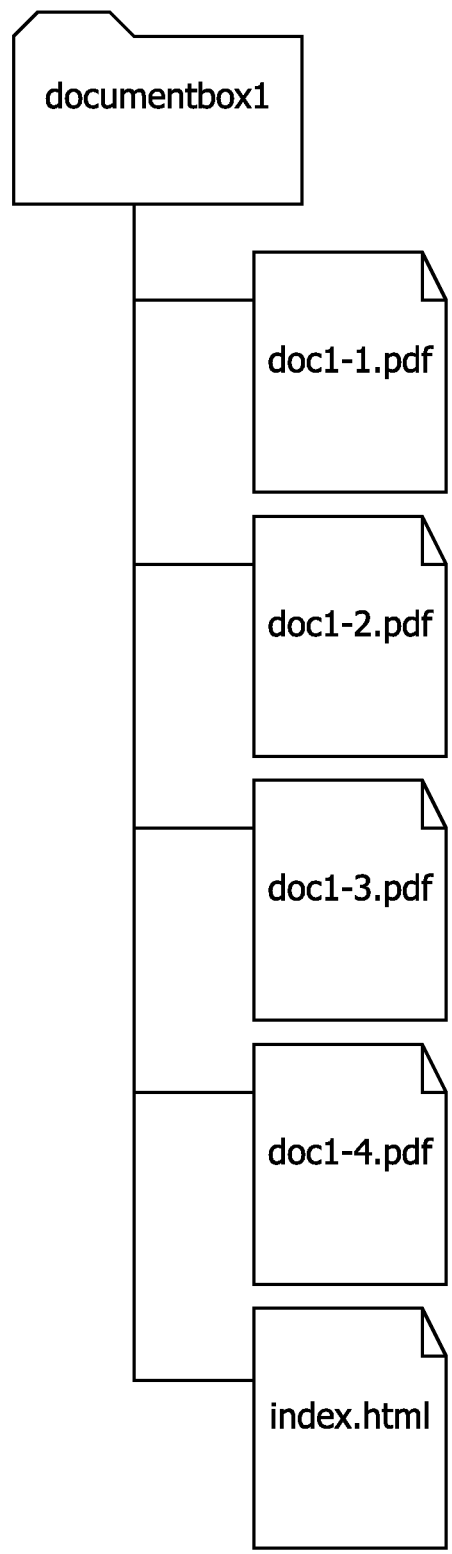
FIG. 3 shows a diagram that indicates an example of plural image files stored in a specific folder on a single job in Embodiment 1.
Figure 4:
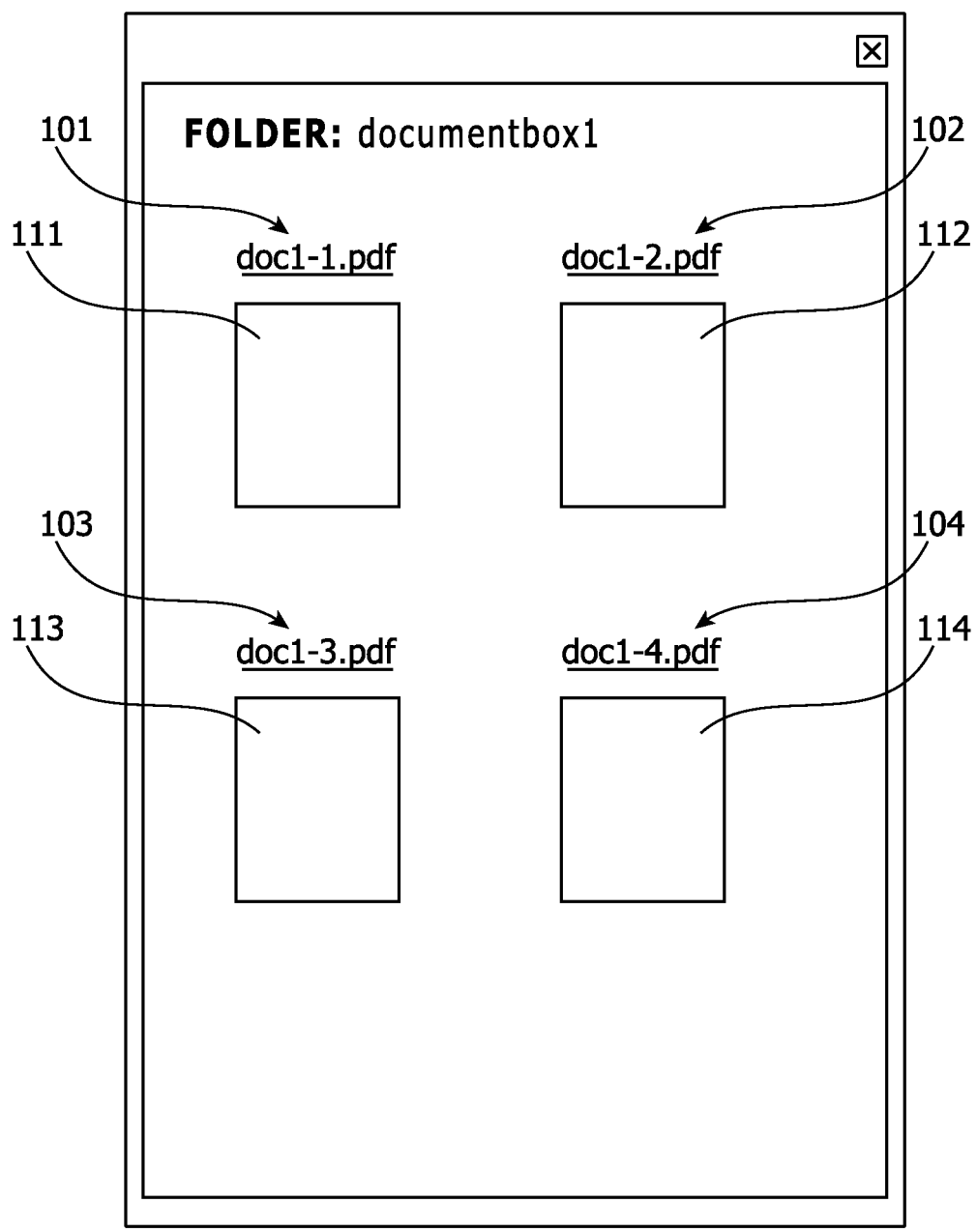
FIG. 4 shows a diagram that indicates an example of a screen that includes a list of image files displayed on a terminal device 2 on the basis of a page data file stored in the specific folder in Embodiment 1.

FIG. 3 shows a diagram that indicates an example of plural image files and a page data file stored in a specific folder on a single job in Embodiment 1. FIG. 4 shows a diagram that indicates an example of a screen that includes a list of image files displayed on the terminal device 2 on the basis of a page data file stored in the specific folder in Embodiment 1.

For example, as shown in FIG. 3, when four image files "doc1-1.pdf", "doc1-2.pdf", "doc1-3.pdf" and "doc1-4.pdf" corresponding to a four-page document are stored into a specific folder "documentbox1", a page data file "index.html" is stored into the specific folder "documentbox1", and a URL of the specific folder (e.g. http://192.168.0.xx/documentbox1) is included in a message to be transmitted to a user. Afterward, when a hyperlink of the URL included in the message is clicked with a user operation, the terminal device 2 transmits a transmission request that specifies the URL. When receiving the transmission request, the server 45 transmits the file "index.html" (i.e. page data file) corresponding to the specified URL as a response in accordance with HTTP (HyperText Transfer Protocol). When receiving the file "index.html", the terminal device 2 displays a screen (as shown in FIG. 4, for example) based on the file "index.html" on a display device. For example, as shown in FIG. 4, in this screen, for the aforementioned four image files, hyperlinks 101 to 104 and shrunk images (e.g. thumbnail images or the like) 111 to 114 are displayed respectively. Consequently, a user can visually confirm an image of each image file and find a user's desired image file, and can cause the terminal device 2 to download the user's desired image file.

Figure 5:
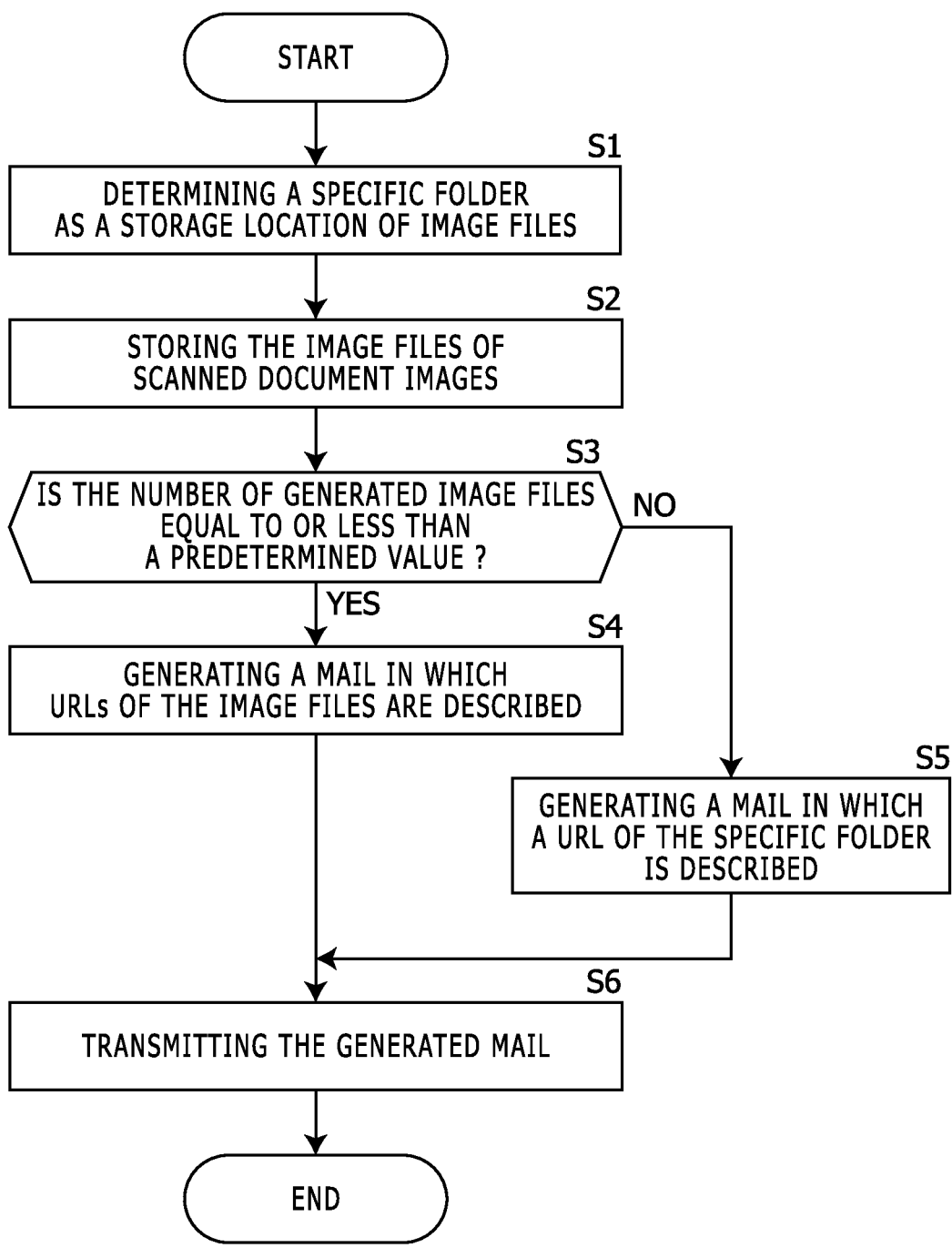
FIG. 5 shows a flowchart that shows a behavior of the image scanning apparatus in Embodiment 1.

The following part explains a behavior of the image scanning apparatus 1 in Embodiment 1. FIG. 5 shows a flowchart that shows a behavior of the image scanning apparatus 1 in Embodiment 1.

When the job managing unit 41 receives a job request of a scan URL transmission job, for example, the image acquiring unit 42 determines a specific folder specified by a job setting (in Step S1), and acquires one or more image files of one or more document images scanned by the image scanning unit 11 and stores the one or more image files into the specific folder (in Step S2).

In Embodiment 1, in this process, for example, for a one-page document, one image file is stored on this job, and for an N-page document (N>1), N image files or one file are/is stored on this job in accordance with the job setting.

Subsequently, the condition determining unit 43 determines whether the number of the image files stored into the specific folder on this job is equal to or less than a predetermined value or not (in Step S3).

If the number of the image files stored into the specific folder on this job is equal to or less than the predetermined value, then the condition determining unit 43 selects URLs of the image files generated and stored on the single job, and the communication processing unit 44 generates a mail (email) that includes the selected URLs of the image files (i.e. URLs of the same number as the number of the stored image files) (in Step S4).

Contrarily, if the number of the image files stored into the specific folder on this job is not equal to nor less than the predetermined value, then the condition determining unit 43 selects a URL of the specific folder into which the image files are stored on the single job, and the communication processing unit 44 generates a mail (email) that includes the selected URL of the specific folder (in Step S5).

Subsequently, the communication processing unit 44 transmits the generated mail using the communication device 14 (in Step S6).

If the mail that includes the URLs of the image files is transmitted, then the mail is displayed on the terminal device 2, and when a hyperlink that indicates any of the URLs is clicked, a transmission request is transmitted to the server 45, and an image file of this URL is downloaded from the server 45 to the terminal device 2.

Contrarily, if the mail that includes the URL of the specific folder is transmitted, then the mail is displayed on the terminal device 2, and when a hyperlink that indicates this URL is clicked, a transmission request is transmitted to the server 45, and a page data file that indicates a list of the image files is downloaded from the server 45 to the terminal device 2 as mentioned, and consequently the list of the image files is displayed on the terminal device 2 as shown in FIG. 4, for example. Afterward, when a link that indicates a URL of any of the image files is clicked with a user operation, a transmission request is transmitted to the server 45, and an image file of this URL is downloaded from the server 45 to the terminal device 2.

As mentioned, in Embodiment 1, the image scanning unit scans a document image from a document and generates image data of the document image, and the image acquiring unit 42 acquires the image data generated on a single job, generates an image file including the image data, and stores the image file into a specific folder. The condition determining unit 43 selects (a) network identifiers of the image files generated and stored on the single job or (b) a network identifier of the specific folder, on the basis of the number of the image files generated and stored on the single job. The communication processing unit 44 transmits to a specific destination a message that includes the selected network identifiers of the image files or the selected network identifier of the specific folder.

Consequently, network identifier notification function for scanned images such as scan URL transmission function is provided with high usability.

Specifically, if a small number of the image file(s) is/are stored, then a user can immediately download a desired image file by specifying a network identifier in the message. Contrarily, if a large number of the image files are stored, then a user can select a desired image file in a list of the image files stored in the specific folder and download the desired image file by specifying a network identifier in the message, without downloading an unnecessary image file as mentioned.

Embodiment 2

In Embodiment 2, if an uppermost size of the generated image file is set in the job setting, then the image acquiring unit 42 determines whether the image data should be divided or not on the basis of a size of the image data; and if the image acquiring unit 42 determines that the image data should be divided, then the image acquiring unit 42 divides the image data into plural pieces of divisional image data and generates plural image files respectively including the plural pieces of divisional image data so as to cause a size of each of the image files to be equal to or less than the uppermost value. In addition, in the same manner as Embodiment 1, on the basis of the number of the plural image files (i.e. the number of plural image files generated and stored on the single job), the condition determining unit 43 selects (a) network identifiers of the image files or (b) a network identifier of the specific folder. Here the image data is divided page by page (i.e. the image data is not divided at a middle of a page image).

Other parts of the configuration and behaviors of the image scanning apparatus in Embodiment 2 are identical or similar to those in Embodiment 1, and therefore not explained here.

As mentioned, in Embodiment 2, even if the image data is forcibly divided in accordance with the size of the generated image file and thereby plural image files are generated, either the network identifiers of the image files or the network identifier of the specific folder are/is selected as well as Embodiment 1.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image scanning apparatus, comprising:
   an image scanning unit configured to scan a document image from a document and generate image data of the document image;
   an image acquiring unit configured to acquire the image data generated on a single job, generate image files including the image data, and store the image files into a specific folder;
   a condition determining unit configured to select (a) network identifiers of the image files or (b) a network identifier of the specific folder, on the basis of the number of the image files generated and stored on the single job; and
   a communication processing unit configured to transmit to a specific destination a message that includes the selected network identifiers of the image files or the selected network identifier of the specific folder,
   wherein the image acquiring unit determines whether the image data should be divided or not on the basis of a size of the image data; and if the image acquiring unit determines that the image data should be divided, then the image acquiring unit divides the image data into plural pieces of divisional image data and generates plural image files respectively including the plural pieces of divisional image data so as to cause a size of one image file to be equal to or less than a predetermined uppermost value; and
   the condition determining unit selects (a) network identifiers of the image files or (b) a network identifier of the specific folder, on the basis of the number of the image files including the plural pieces of the divisional image data.

2. The image scanning apparatus according to claim 1, further comprising a server;
   wherein the image acquiring unit generates a page data file to display a list of the image files stored in the specific folder and stores the page data file into the specific folder; and
   the server (a) transmits an image file when receiving a request that specifies a network identifier of the image file, and (b) transmits the page data file when receiving a request that specifies a network identifier of the specific folder.

3. The image scanning apparatus according to claim 1, wherein the network identifier is a URL.

4. An image scanning apparatus, comprising:
- an image scanning unit configured to scan a document image from a document and generate image data of the document image;
- an image acquiring unit configured to acquire the image data generated on a single job, generate image files including the image data, and store the image files into a specific folder;
- a condition determining unit configured to select (a) network identifiers of the image files or (b) a network identifier of the specific folder, on the basis of the number of the image files generated and stored on the single job; and
- a communication processing unit configured to transmit to a specific destination a message that includes the selected network identifiers of the image files or the selected network identifier of the specific folder, wherein if the number of the image files generated and stored on the single job is equal to or less than a predetermined value, the condition determining unit selects the network identifiers of the image files; and if the number of the image files generated and stored on the single job is larger than the predetermined value, the condition determining unit selects the network identifier of the specific folder.

5. The image scanning apparatus according to claim 4, wherein the predetermined value is specified by a user.

\* \* \* \* \*